Patented May 28, 1946

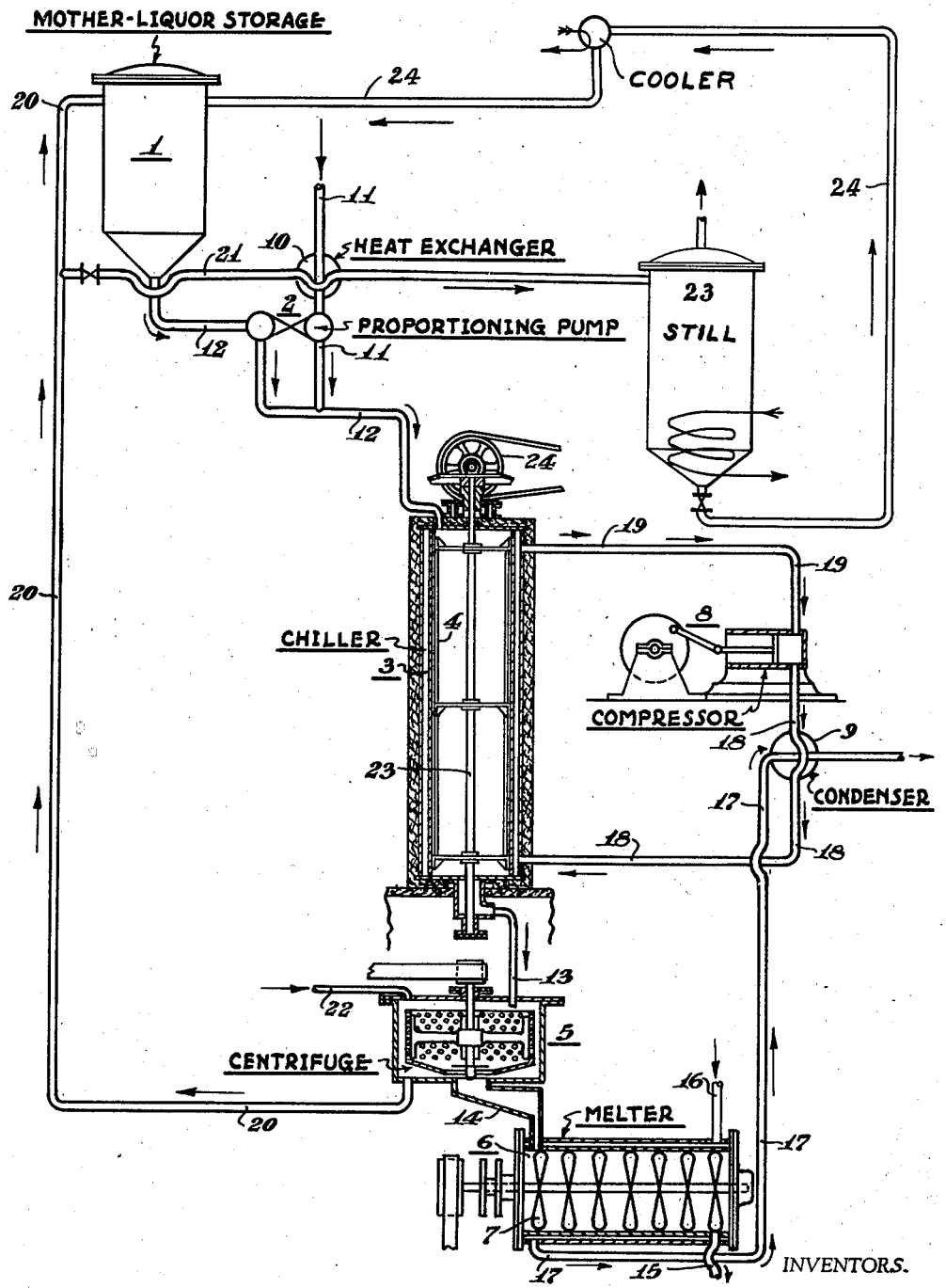

2,400,883

UNITED STATES PATENT OFFICE 2,400,883

METHOD OF REFINING LIGHT-OIL PRODUCTS

William O. Keeling and William Ludomier Glowacki, Pittsburgh, Pa., assignors to Koppers Company, Inc., a corporation of Delaware Application January 6, 1941, Serial No. 373,290

1 Claim. (Cl. 260—674)

The present invention relates to a continuous process for separating a benzene product of improved melting point from a product of lesser purity, and is an improvement in the method of the application, KRLO, for U. S. Letters Patent filed by the one of us, William O. Keeling, of even date, January 6, 1941, Serial No. 373,291.

An object of the present invention is to provide a continuous process for separating benzene from associated impurities of lower freezing point by a method of crystallization such that the formed crystals are of relatively small size and are relatively independent of each other so that there is a decreased tendency on their part to entrain mother liquor from which the small-sized crystals are easily and extensively separable with significantly reduced entrainment of the former.

A further object of the present invention is to provide a continuous process whereby a purified benzene of uniform melting point can be recovered by continuously adjusting the volume of produced mother liquor to maintain therein a preferred impurity concentration.

A further object of the present invention is to provide a continuous process whereby benzene of optionally regulable melting point can be continuously recovered from the process with a minimum production of mother liquor.

A further object of the present invention is to provide simple and effective method whereby constituents associated with an impure benzene are concentrative in a mother liquor to a greater extent than is possible by a one-step freezing method and at the same time makes separable from such mother liquor a crystallized benzene product of a preferred melting point.

A further object of the present invention is the provision of a continuous process whereby an impurity-containing benzene can be so treated that a greatly improved efficiency of recovery of a benzene having a preferred melting point is obtainable therefrom.

The invention has for further objects such other improvements and such other operative advantages or results as may be found to obtain in the processes or apparatus hereinafter described or claimed.

One of the problems encountered in obtaining a benzene of high melting point by known processes of freezing is the difficulty of crystallizing the benzene in such form that the crystals are easily separable from the impurity-bearing mother liquor. In the freezing of impure benzene, especially when the same is quiescent, the benzene crystallizes in long needle-like interlacing crystalline clusters within which there are interstices that occlude portions of the mother liquor, the result being that the individual crystals and mother liquor cannot be completely separated by filtration or even by centrifuging.

According to the present invention the to-be-purified benzene is flowed as a stream through a freezing apparatus at a velocity adequate to retain formed crystals of benzene continually in suspension in mother liquor and the walls of the freezing chamber substantially free of benzene incrustations, the rate of chilling being such that a partial freezing of the available benzene takes place in the form only of small individual crystals that are uniformly distributed through mother liquor comprising benzene and associated impurities, and the extent of chilling being such that a flowable slurry results. Thereafter by centrifuging said suspension of individual benzene crystals in mother liquor there is effected a very substantial separation of purified benzene which has most of the residual mother liquor present only on the surfaces of separate individual crystals. The so-separated cold mother liquor is admixed with further quantities of the to-be-purified benzene and the hereinabove described steps repeated. The cold content of the mother liquor is thus utilized with resultant economy in the required power for freezing.

In the operation of the continuous process of the present invention impurities in the recycled mother liquor naturally increase in concentration, the rate of such increase depending on the concentration of impurities contained in the to-be-treated benzene and the amount of benzene that is crystallized therefrom per cycle of operation. With increasing concentration of impurities in the mother liquor, separated benzene crystals will slowly yet progressively decrease in their purity and show lowering freezing points. An important feature therefore of the improvement provides that a small preferred portion of the mother liquor is continuously withdrawn from the process-system as a side-stream whereby to maintain the concentration of the impurities in the total mother liquor at any preferred level. The side-stream is preferably removed from the returned mother liquor before the same is admixed with new quantities of the to-be-treated benzene and the mixture sent to the freezing zone. This makes it feasible continuously to produce benzene crystals of uniform melting point with a given removal thereof. By varying the volume of mother liquor removed from the process-system in the side-stream, the concentration of impurities continuously recirculated in the process-system can be regulated and varied to produce benzene crystals of optionally regulable melting point.

In the accompanying drawing forming a part of this specification and showing for purposes of exemplification a preferred apparatus and method in which the invention may be embodied and practiced but without limiting the claimed invention specifically to such illustrative instance or instances, there is illustrated in diagrammatic manner apparatus suitable for carrying out the present invention.

The benzene to be purified is withdrawn through line 11 by proportioning pump 2 from a storage tank (not shown) through heat exchanger 10 wherein it receives a preliminary chilling by indirect contact with cold mother liquor from a further step in the process. At the juncture of lines 11 and 12 the inflowing to-be-purified benzene is admixed in empirically determined proportions with cold mother liquor that is withdrawn from storage tank 1, therefor, also by proportioning pump 2 which introduces it into line 12. The new admixture of inflowing benzene and mother liquor continues along line 12 whereby it is flowed into chiller 3. In chiller 3 the admixture is rapidly chilled thereby producing a suspension of fine benzene crystals in mother liquor wherein they are kept in suspension by the movement of the admixture through the chilling apparatus. For that small quantity of the crystals that accumulates on the chilling surfaces in spite of the velocity of the moving suspension, there is provided a scraper apparatus 4, which is slowly rotatable on shaft 23 by driven wheel 24, at such times as necessary, to remove them from said surfaces into the moving suspension.

The flowable suspension or slurry, which contains in crystalline form preferably that amount of benzene which was introduced into line 11 by proportioning pump 2, flows under the influence of the latter through line 13 into separating means 5, preferably a vapor-tight continuous centrifuge, for separating the crystalline benzene from mother liquor, the former (crystalline benzene) being transferred by appropriate means along inclined chute 14 to melter 6 therefor, whereas the latter (mother liquor) passes through line 20 to mother-liquor storage tank 1 for recycling in the process.

In melter 6 the benzene crystals are slowly moved by agitator 7 to bring them quickly to the adjacent surface of a water jacket surrounding the melter apparatus where they come into indirect contact with and are melted by water introduced into said jacket through line 16 and withdrawn therefrom through line 17. As the crystals of benzene melt, they extract heat from the water flowing through the jacket, this colder water being thereafter flowed through condenser 9 and there employed completely to cool hot refrigerant gas issuing from compressor 8 and employed in the jacket of chiller 3 as the refrigerant, or optionally employed in a later step of a stepwise cooling of the refrigerant gas. The purified liquid benzene is drained from melter 6 through line 15 to storage therefor (not shown).

Any preferred refrigerant can be employed in the process for flowing through the jacket of chiller 3. In the illustrated instance however this refrigerant is a chilled gas which, after compression in compressor 8 and having its temperature reduced by passage through condenser 9 where, as above mentioned, it is cooled by cold indirectly obtained by the melting of purified benzene, flows through line 18 into the jacket of chiller 3 and leaves the same through line 19 whereby it is returned for recompression to the inlet of compressor 8.

According to the improvement there is continuously extracted as a side-stream through valved branch line 21 from the crystal-free cold mother liquor continuously flowing through line 20, an amount of fouled mother liquor containing an amount of impurities equivalent to the amount of further such impurities that will be introduced into the recycled mother liquor, flowing on through 1 and 12 by new quantities of the to-be-purified benzene (entering through 11) before the mother-liquor (from 20 and 1 and 2) is recycled into the chiller. The mother liquor in the side-stream (through 21) is continuously flowed through heat exchanger 10 wherein in indirect contact it gives up a quantity of its cold to the new benzene entering the system through line 11. By means of this side-stream it is obvious that the impurities removed from the purified benzene are continuously discharged from the system and a predetermined concentration thereof in the mother liquor is continuously maintained. The rate can be optionally determined as hereinabove indicated continuously to produce a benzene of a preferred melting point. It is obvious that if a benzene of higher melting point is desired, the rate of withdrawal must be greater than that when one of somewhat lower melting point is being produced.

The further raising of the melting point of the purified benzene can be achieved, if preferred, by washing the separated crystals while they are in the separating means for the further removal of residual mother liquor with, for example, small quantities of purified benzene that have already been produced by the process and are introduced through line 22 into separator means 5. Purified benzene from another source may be so employed.

The benzene and impurities removed from the system in the side-stream may be directly disposed of as a motor fuel or they may be sent to a distillation apparatus 23 wherein by fractional distillation, the impurity content is again reduced to that amount contained in the benzene treated in the system and then returned to the process for further treatment as by line 24. In this way the percentage of recoverable material of improved melting point can be significantly increased.

The following specific example is illustrative of the results obtainable by the operation of the present process.

Liquid benzene having a melting point of 4.78° C. was admixed in the volume ratio of about 1.7 to 1 with cold mother liquor obtained from previous crystallizations of benzene, the mixture thereafter being passed to a chilling zone where its temperature was reduced to about −8° C. and benzene allowed to crystallize therefrom until a flowable slurry was formed. This slurry was then passed to a cold centrifuge wherein the crystallized benzene was separated from cold mother liquor which was returned to the freezing zone in admixture in the above-stated ratio with new quantities of the to-be-treated benzene of 4.78° C. melting point, and after fouled mother-liquor of about 20 per cent by volume of the inlet raw benzene had been removed from the recycling mother liquor and the system. After so treating about 4170 units of the initial benzene, there was recovered 3330 units or about 80 per cent yield of a purified benzene product having a melting point of 5.50° C.

When in the operation of this process on the same raw material, the melting point of the recovered benzene was raised from 5.50° C. to 5.56° C. by withdrawing from the system a quantity of mother liquor, in volume about 35 per cent of the inflowing impure benzene instead of the above 20 per cent thereof as a side-stream, the yield of improved benzene product was reduced to substantially 65 per cent of the total volume of impure product being treated.

When the side-stream of mother liquor removed from the process system was reduced to an amount whose volume was only 8.4 per cent of the initial impure benzene introduced thereinto, about 91 per cent of the latter was recovered as an improved product having a melting point of 5.32° C.

In the above-described specific example the admixture of to-be-treated benzene to mother liquor was maintained in a volume ratio of about 1.7 to 1. This ratio is empirical and will vary with the impurity content of the to-be-treated material to always assure an easily flowable and separable slurry of benzene crystals in mother liquor. It is of course obvious that when the impurities in the to-be-purified material are so extensive that it is no longer possible to return any of the mother liquor to the system for purposes of crystallizing therefrom a benzene of preferred melting point, then the whole volume of mother liquor becomes the side-stream.

The present invention is of great utility in separating highly refined benzene from impurities whose physical characteristics make them difficult of separation with the distillation equipment normally available and whether or not the to-be-purified benzene is derived from coke-oven light oil, petroleum, water-gas tar, drip oils or from special syntheses.

The invention as hereinabove set forth is embodied in particular form and manner but may be variously embodied within the scope of the claims hereinafter made.

I claim:

A continuous cyclic process for producing by crystallization a benzene product of higher melting point by freezing from impurer highly refined benzene of fluctuating impurities-content, comprising the steps of: continuously introducing newly incoming impure benzene product aforesaid into admixture with such a quantity of still cold recycled mother liquor recovered from the impure benzene that has been treated in the cyclic process and contains substantially only constituents derived from said impure benzene that has been treated as to retain formed crystals in suspension in the mother liquor as a flowable slurry in the following crystallizing step; continuously flowing admixture aforesaid from the admixing step through chilling means and crystallizing therein only a major portion of the newly incoming benzene as benzene of a predetermined elevated melting point from the admixture by freezing while in continuous flow therethrough; continuously flowing the resultant continuously flowing slurry into a separating zone and continuously separating the same into a purified crystalline benzene fraction and an impurities-contaminated fraction of mother liquor; removing from said contaminated mother liquor fraction to be recycled portions thereof so as to enable it to take up fresh mother liquor resulting from the crystallizing of the continuously introduced newly incoming impure benzene product to maintain the recycled mother liquor in condition to remove impurities from the newly incoming benzene to the extent required to maintain the melting point of said separated crystalline benzene at a predetermined elevated level; and continuously recycling the residual mother liquor to the aforesaid step of introducing newly incoming impure benzene product into admixture therewith, and which includes the steps of reducing the concentration of impurities in the mother liquor of the portions removed from the fraction to be recycled and returning the residual mother liquor of reduced impurities content to the cycle.

WILLIAM O. KEELING.
WILLIAM LUDOMIER GLOWACKI.